Oct. 26, 1943.                J. O. YEIDA                    2,333,066
                             CONTROL MEANS
                        Filed April 18, 1942            2 Sheets-Sheet 2

INVENTOR:
JOHN O. YEIDA,
BY Kingsland Rogers & Ezell
                      ATTORNEYS.

Patented Oct. 26, 1943

2,333,066

UNITED STATES PATENT OFFICE 2,333,066

CONTROL MEANS

John O. Yelda, Herculaneum, Mo., assignor to Automatic Control Corporation, St. Louis, Mo., a corporation of Delaware Application April 18, 1942, Serial No. 439,567

6 Claims. (Cl. 236—78)

The present invention relates to a control means. More particularly, it comprehends a control means for governing circuits including devices of varying impedance to the flow of current, in accordance with that impedance.

Generally, the invention includes a relay for use with a device, such as a motor, that draws a greater current at one time, such as in starting, than it does at another time, such as in maintaining speed. The relay includes a first coil that may be energized by some master control to close a switch and thereby to energize the motor. It may likewise include an additional coil energized through the closing switch and which is sufficient to hold the switch closed when carrying an amount of current such as that initially flowing through the motor windings, but insufficient to hold the switch closed when the motor comes up to speed and the current consequently decreases.

Broadly, the objects of the invention are to provide a control that will hold the device to be operated in operation at least for the time required to reduce its current drawn to a predetermined amount and prevent instantaneous or spot operation of the device or spot making-and-breaking of the contact with the disadvantages obviously resulting therefrom.

Further objects are to provide a control for a follow-up motor that will assure operation of the motor for at least a sensible period of time whenever its circuit is closed at all; and further it is an object to provide such a control adapted for use with a reversible follow-up motor adapted for operating heat controlling louvres in aircraft motors to ensure operation of the motor in either of its directions for a sensible period of time, whenever the external control, such as the thermostat, instantaneously closes the motor circuit for either direction of operation.

Figure 1:
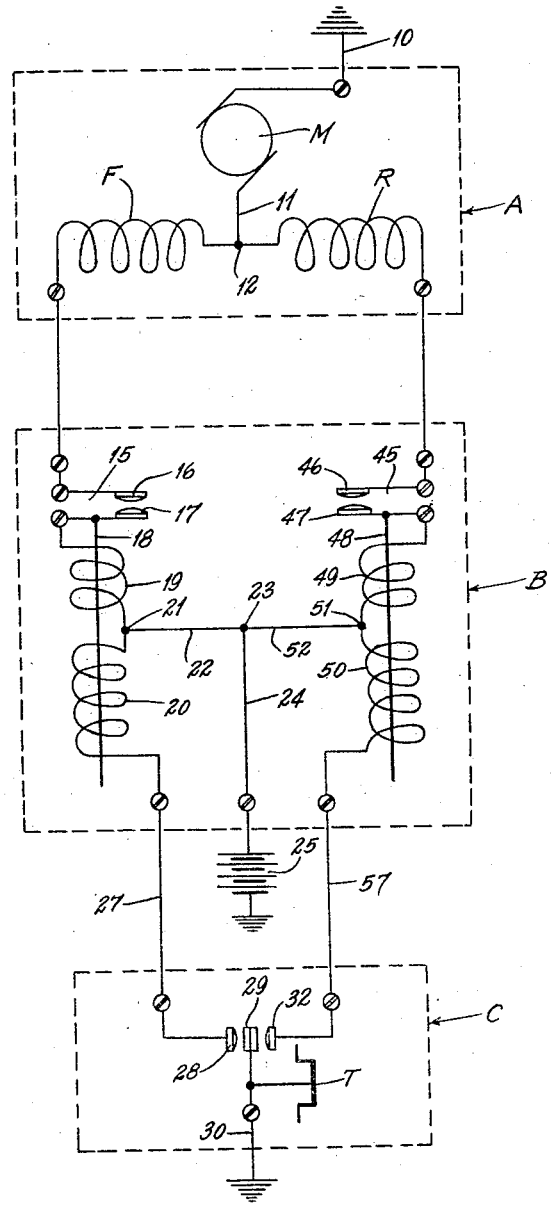
Fig. 1 is a diagrammatic view of the mechanism.

In Fig. 1, the section A represents generally a reversible motor; the section B represents a relay for use therewith; and the section C represents generally an external switch control.

It is not intended that these several parts need be separate, but they may conveniently be described separately.

The portion A includes a motor generally indicated at M having one electrical lead 10 grounded. The other electrical lead 11 extends to a junction 12 from which branch a forward winding F and a reverse winding R for the motor.

Each of the motor windings is connected through a switch and relay coil. The motor winding F is connected to a switch 15, having a relatively fixed contact 16 and a movable contact 17, the latter being operated by a core 18 influenced by a first coil 19, and a second coil 20. The coil 19 has relatively few turns in it. The two coils 19 and 20 may be mechanically wound together and distinguishable only by their position relative to the junction point 21, from which a lead 22 extends to a junction point 23, and thence via line 24 to a battery 25, the opposite pole of which is grounded.

Thus the junction 21 is connected with both coils 19 and 20. The other end of the coil 20 extends via a lead 27 to the relatively fixed contact 28 of the control switch C. This contact 28 may be closed with a movable contact 29 connected with ground by a suitable lead 30. The contact 29 may be operated by any power means, such as a thermostat T, so as to contact with either the contact 28 or the contact 32. The thermostat T may most desirably be of the form shown in the copending application of this applicant, filed April 23, 1942, Serial No. 440,193, and diagrammatically represented in Fig. 2, to be described. With less advantages, it may also be used with a type of thermostat, such as shown in Persons' Patent No. 2,180,018, without the snap action.

The other coil or reverse winding R is the same as the one previously described. It is connected to a switch 45 having contacts 46 and 47, the latter being movable with a core 48 operated by a coil 49 and a coil 50. A line 52 leads from a junction 51 to the junction 23. The other end of the coil 50 is connected by a lead 57 to the contact 32.

Figure 2:
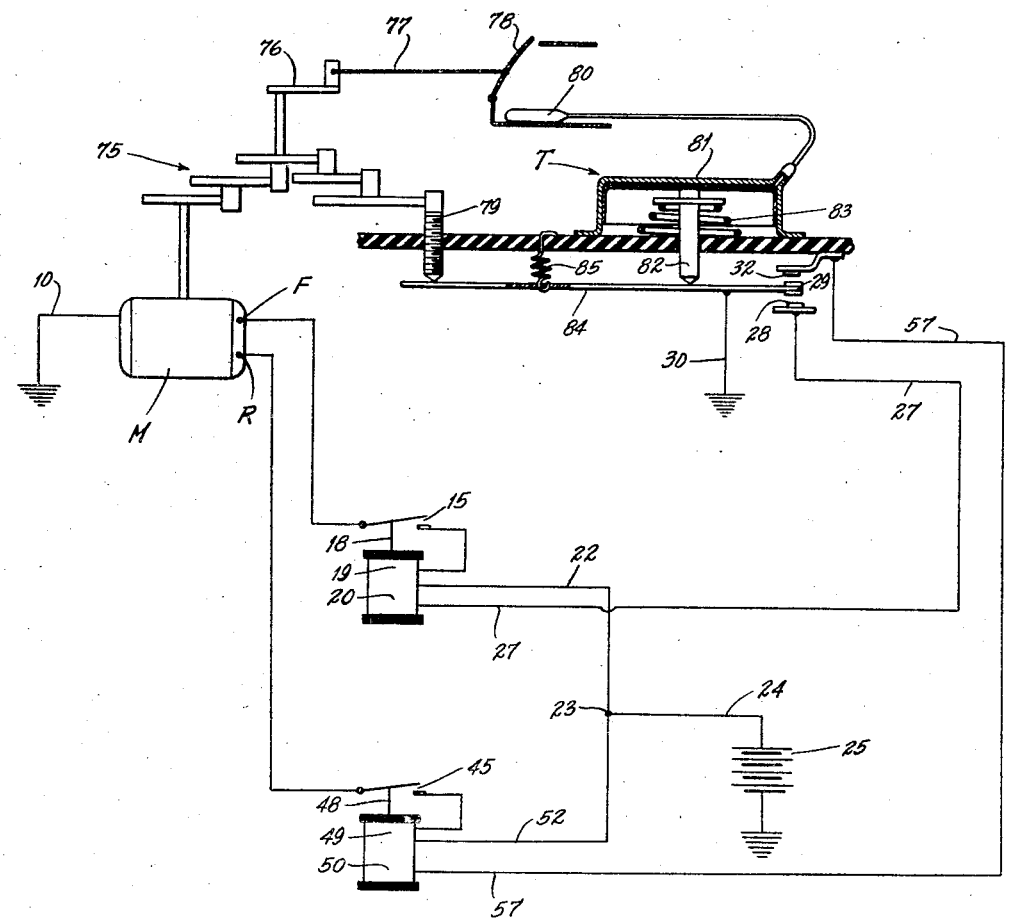
Fig. 2 is a diagrammatic view of the mechanism applied to an aircraft control.

In Fig. 2, the motor M is shown as operating a gear train 75 in which occurs an operating crank 76, connected by any suitable linkage 77 to a louvre or the like 78 of an airplane motor. The gear train also operates a screw 79 in connection with the thermostat T.

The thermostat T includes a bulb 80 located in the temperature controlled zone, and connected to a diaphragm chamber 81. The chamber, bulb and connection are preferably completely filled with a liquid that remains liquid throughout the operating range.

The diaphragm chamber expands downwardly in Fig. 2, displacing a stud 82 maintained against it by a spring 83. The stud, directly or indirectly, effects movement of a lever 84, urged by a spring 85 against the stud and the screw 79. The lever 84 has the contact 29 on it, which may shift between the fixed contacts 28 and 32.

In operation of the mechanism of Fig. 2, occasioned by rise or fall of temperature at the bulb 80, the motor will start in forward or reverse direction. But the motor operates the screw 79, which will advance or retract to effect opening of the contact 29 from the contact 28 or contact 32, as the case may be, after a predetermined operation of the motor. Hence, the louvre 78 will be opened or closed to a position corresponding to the temperature at the bulb. The extreme positions are represented by travel of the crank 180°, although greater or lesser travel may be used as desired.

In operation, at the start the contact 29 is at a neutral position between the contacts 28 and 32. The switches 15 and 45 are open. The motor M is stopped.

Upon a shift of the contact 29 in either direction, such as could be caused by the thermostat T, the mechanism will be put in operation. Assume that the contact 29 closes with the contact 28. Since the contact 29 is connected with ground, a circuit will then exist as follows: from ground, line 30, contact 29, contact 28, line 27, coil 20, line 22, line 24, battery 25 and ground. This will energize the large coil 20 to pull up the armature 18 and to close the switch 15. Upon closure of the switch 15, an additional circuit will be established through the motor M, which is connected to ground through the line 10. This circuit runs through line 10, motor M, line 11, forward coil F and switch 15, small coil 19, line 22, line 24, battery 25 and ground.

Assume at this point, that the contact 29 is broken away from the contact 28, such as by a reversing of the thermostatic action. The motor M as just been put in circuit but, owing to the fact that it is not up to speed, it draws a high current through the coils F and 19. This high current through the coil 19 is sufficient to hold the core 18 up and maintain the switch 15 closed, despite the fact that the coil 20 became deenergized when the contact 29 broke. The switch 15 will, therefore, be maintained closed until the back E. M. F. of the motor produces a back current that reduces the effective current through the coil 19 below the amount at which it can sustain the core 18. This condition will arise by the time the motor M comes up to speed. Thereupon, the switch 15 will open and the motor will stop.

The same operation will occur when the contact 29 closes on the reverse contact 32. This will energize the reverse coil R and the motor M will run in the opposite direction.

As set forth in Fig. 2, this mechanism has particular value in connection with follow-up motors, in which the motor M itself causes the contact 29 to break after a short interval of operation at a given setting of the thermostat. The motor M, in turn, may operate such a mechanism as the louvres controlling the cooling of airplane motors, or any one of numerous other devices requiring a control of this kind.

What is claimed is:

1. In a mechanism of the kind described, a motor, a winding therefor associated with the motor in such wise as to conduct a current that decreases as the speed of the motor increases, a relay switch controlling the flow of current through the winding, a first coil for the relay, a circuit for said first coil, means to close said circuit, a second coil for the relay, said second coil being in series with the motor winding, and said second coil being of insufficient capacity to hold the switch closed when the motor is up to speed, but of sufficient capacity to hold the switch closed until the motor comes up to speed.

2. In a mechanism of the kind described, a motor, a winding therefor adapted to conduct a relatively high current when the motor is operating below a predetermined speed that decreases to a relatively low current when the motor comes up to said speed, a circuit for the motor and winding, means to close the circuit including a switch and a holding coil in series with the winding, said holding coil having a capacity to maintain the switch closed when energized by the aforesaid relatively high current, but having insufficient capacity to hold the switch closed when supplied only with the aforesaid relatively low current after the motor comes up to speed.

3. In a mechanism of the kind described, a motor, a forward winding and a reverse winding therefor, a forward circuit and a reverse circuit for the two windings respectively, each circuit having a switch therein and each circuit having a coil in series with the switch, the coil being adapted to maintain the switch closed when suitably energized by virtue of the current flowing through the circuit, an additional circuit in parallel with each of the foregoing circuits, each additional circuit including a coil adapted to close the switch and also including a contact, a power means, and contact means operated by the power means selectively to engage the contacts of either of the two additional circuits whereby when the power means closes its contact with one of the two contacts of the additional circuit the coil in that circuit will be energized, the switch in the corresponding winding circuit will be closed, and current will flow through the winding circuit in quantities sufficient so that the series coil can maintain the switch closed until the motor comes up to speed.

4. In a mechanism of the kind described, a motor, a forward winding and a reverse winding therefor, a forward circuit and a reverse circuit for the two windings respectively, each circuit having a switch therein and each circuit having a coil in series with the switch, the coil being adapted to maintain the switch closed when suitably energized by virtue of the current flowing through the circuit, an additional circuit in parallel with each of the foregoing circuits, each additional circuit including a coil adapted to close the switch and also including a contact, a thermostat, contact means operated by the thermostat selectively to engage the contacts of either of the two additional circuits whereby when the thermostat closes its contact with one of the two contacts of the additional circuits, the coil in that circuit will be energized, the switch in the corresponding winding circuit will be closed, current will flow through the winding circuit in quantities sufficient so that the series coil can maintain the switch closed until the motor comes up to speed, and means operated by the motor to separate the thermostat contact from its additional circuit contact after a predetermined operation of the motor.

5. In a mechanism of the kind described, a motor, a forward winding and a reverse winding therefor, a forward circuit and a reverse circuit for the two windings respectively, each circuit having a switch therein and each circuit having a coil in series with the switch, the coil being adapted to maintain the switch closed when suitably energized by virtue of the current flowing through the circuit, an additional circuit in parallel with each of the foregoing circuits, each additional circuit including a coil adapted to close the switch and also including a contact, a thermostat, contact means operated by the thermostat selectively to engage the contacts of either of the two additional circuits, whereby when the thermostat closes its contact with one of the two contacts of the additional circuits, the coil in that circuit will be energized, the switch in the corresponding winding circuit will be closed, current will flow through the winding circuit in quantities sufficient so that the series coil can maintain the switch closed until the motor comes up to speed, means operated by the motor to separate the thermostat contact from its additional circuit contact after a predetermined operation of the motor, and heat control means operated by the motor.

6. In a mechanism of the kind described, a motor, an operating circuit for the motor adapted to conduct a current that decreases from a relatively high current when the motor operates below a predetermined speed to a relatively low current when the motor attains said predetermined speed, current-responsive means to maintain said circuit closed, operated by the current in said circuit, said current-responsive means having capacity to operate to maintain the circuit closed when said current has said relatively high value, but having insufficient capacity to maintain the same closed when the said current has said relatively low value.

JOHN O. YEIDA.